United States Patent
Nakamura et al.

[11] Patent Number: 5,927,750
[45] Date of Patent: Jul. 27, 1999

[54] SIDE IMPACT AIR BAG SYSTEM

[75] Inventors: Junichi Nakamura, Anjo; Tsutomu Ookochi, Okazaki; Noritaka Nagayama, Okazaki; Mikiharu Shimoda, Okazaki; Tosiyasu Hatta, Okazaki; Setuko Hatta, Okazaki, all of Japan

[73] Assignee: Mitsubishi Jidosha Kogyo Kabushiki Kaisha, Tokyo, Japan

[21] Appl. No.: 08/833,449

[22] Filed: Apr. 7, 1997

[30] Foreign Application Priority Data

Apr. 8, 1996 [JP] Japan .................................. 8-085175

[51] Int. Cl.⁶ .................................................. B60N 21/22
[52] U.S. Cl. ............................................................ 280/730.2
[58] Field of Search .................................. 280/729, 730.2

[56] References Cited

U.S. PATENT DOCUMENTS

| | | | |
|---|---|---|---|
| 5,224,732 | 7/1993 | Warner et al. | 280/730.2 |
| 5,492,367 | 2/1996 | Albright et al. | 280/743.1 |
| 5,586,782 | 12/1996 | Zimmerman, II et al. | 280/730.2 |

FOREIGN PATENT DOCUMENTS

| | | |
|---|---|---|
| 0 523704 A1 | 1/1993 | European Pat. Off. . |
| 0 565501 A1 | 10/1993 | European Pat. Off. . |
| 4 142326 A1 | 6/1993 | Germany . |
| 4 334606 A1 | 4/1994 | Germany . |
| 450052 | 2/1992 | Japan . |
| 4356246 | 12/1992 | Japan . |

*Primary Examiner*—Kenneth R. Rice

[57] ABSTRACT

In a side impact air bag system, the blowing direction of gas is regulated by connecting a bag to an inflator through a gas intake portion which suppresses the diffusion of the gas. The bag is formed of a main body, a lower inflation unit, and an upper inflation unit having a vent hole. The upper inflation unit and the lower inflation unit are contained with the main body in a shape of bellows when installed. When the bag is inflated by a gas blown out from the inflator, the bag is inflated from a portion of the main body opposing an abdomen portion having a higher shock load resistance than that of a chest portion, thereby improving the restraining condition of a passenger by regulating the inflating condition of the bag into a desired condition. Consequently, a possibility of the bag being obstructed by vehicle structural members in the process of the bag inflated from inner sides of the upper inflation unit and the lower inflation unit is eliminated, thereby positively inflating the bag.

19 Claims, 12 Drawing Sheets

SIDE IMPACT AIR BAG SYSTEM

FIELD OF THE INVENTION

This invention relates to a side impact air bag system for protecting a passenger (or a driver) in a vehicle when a shock is applied externally to the side of the vehicle.

PRIOR ART

When a shock is applied externally to the side of the vehicle by a side impact or the like, the vehicle door or the vehicle components are deformed by a collision force depending on a magnitude of the shock. To relax the shock force to the passenger caused by the deformation, there have been proposed various air bags which are inflated between the side of the vehicle and the passenger when the side impact occurs, so that the shock force applied to the passenger is absorbed by the air bag to protect the passenger (for example, Japanese Patent Laid-Open 4-50052, Japanese Patent Laid-Open 4-356246 and the like).

The description will be made with regard to a conventional side impact air bag system based on FIGS. 11 and 12. FIG. 11 shows a side view of the conventional side impact air bag system, and FIGS. 12(a),(b) show conditions of a folded bag.

As shown in FIG. 11, a side impact air bag system 51 is provided inside of a seat back 52 in the vehicle so as to maintain a constant relative position with respect to the passenger. The seat back 52 is provided with an inflator 53 serving as a gas generating device, and the inflator 53 is connected to a bag 54. As shown in FIG. 12, the upper and lower portions of the bag 54 are folded outwardly, and the bag is sequentially folded toward the inflator 53. In addition, there is provided detecting means (not shown) for detecting the side impact and blowing gas from the inflator 53 into the air bag.

When a side impact is detected by the detecting means (not shown), gas is momentarily blown out from the inflator 53 into the bag 54 so as to inflate the bag 54 toward the front side of the vehicle (from the conditions shown in FIGS. 12(b)–(a) to the condition shown in FIG. 5), thereby the bag is intervened between the side of the vehicle and the passenger. With the inflated bag 54 disposed between the side of the vehicle and the passenger, the shock applied to the passenger caused by the deformed door and the like is absorbed by the bag thus protecting the passenger.

The conventional side impact air bag system 51 is adapted to inflate the bag 54 in a forward direction when the side impact is detected. However, since the upper and lower portions of the bag 54 are folded outwardly, as shown in FIG. 13, there exists a possibility such that upper and lower portions are interfered by a door trim 55 or an armrest 56 in the process of inflating the bag (indicated by an arrow in the drawing), which results in obstructing the air bag from inflating.

Further, since the bag 54 is communicatingly connected to the inflator 53, when the gas is blown into the bag 54, the entire bag is inflated momentarily. As a result, the upper and lower ends of the bag 54 are shaken and made unstable, and therefore, the bag 54 can not be inflated into a desired condition.

SUMMARY OF THE INVENTION

In a view of the above-mentioned problems, an object of the present invention is to provide a side impact air bag system capable of deploying and inflating the bag into a desired condition without being obstructed by a door and the like.

To achieve the above-mentioned object, there is provided a side impact air bag system having a bag which inflates between a side of a vehicle and a passenger by gas blown out from a gas generating device, wherein the bag comprises a first portion facing an abdomen portion of the passenger when the bag is inflated and a second portion facing a chest portion of the passenger when the bag is inflated, and the second portion being contained within the first portion prior to the inflation of the bag, and deployed from the first portion when the bag is inflated.

In the side impact air bag system, the first portion is sequentially folded toward the gas generating device while containing the second portion prior to the inflation of the bag therein.

Further, in the side impact air bag system, the first portion includes an inflation portion folded within the first portion prior to the inflation of the bag, and deployed in a downward direction when the bag is inflated.

Still further, in the side impact air bag system, the first portion is sequentially folded toward the gas generating device while containing the inflating portion prior to the inflation of the bag.

Yet further, the side impact air bag system comprises an inflation portion folded within the first portion prior to the inflation of the bag, and deployed in a downward direction when the bag is inflated, wherein the first portion is sequentially folded toward the gas generating device while containing the second portion and the inflating portion prior to the inflation of the bag.

Yet further, in the side impact air bag system, an edge of the first portion, when the second portion being contained therein, is releasably joined to be separated at a pressure above a predetermined pressure to allow the deployment of the second portion.

Yet further, in the side impact air bag system, an edge of the first portion, when the second portion and the inflating portion are contained therein, is releasably joined to be separated at a pressure above a predetermined pressure to allow inflation of the second portion and the inflation portion.

DESCRIPTION OF THE PREFERRED EMBODIMENTS

Figure 1:
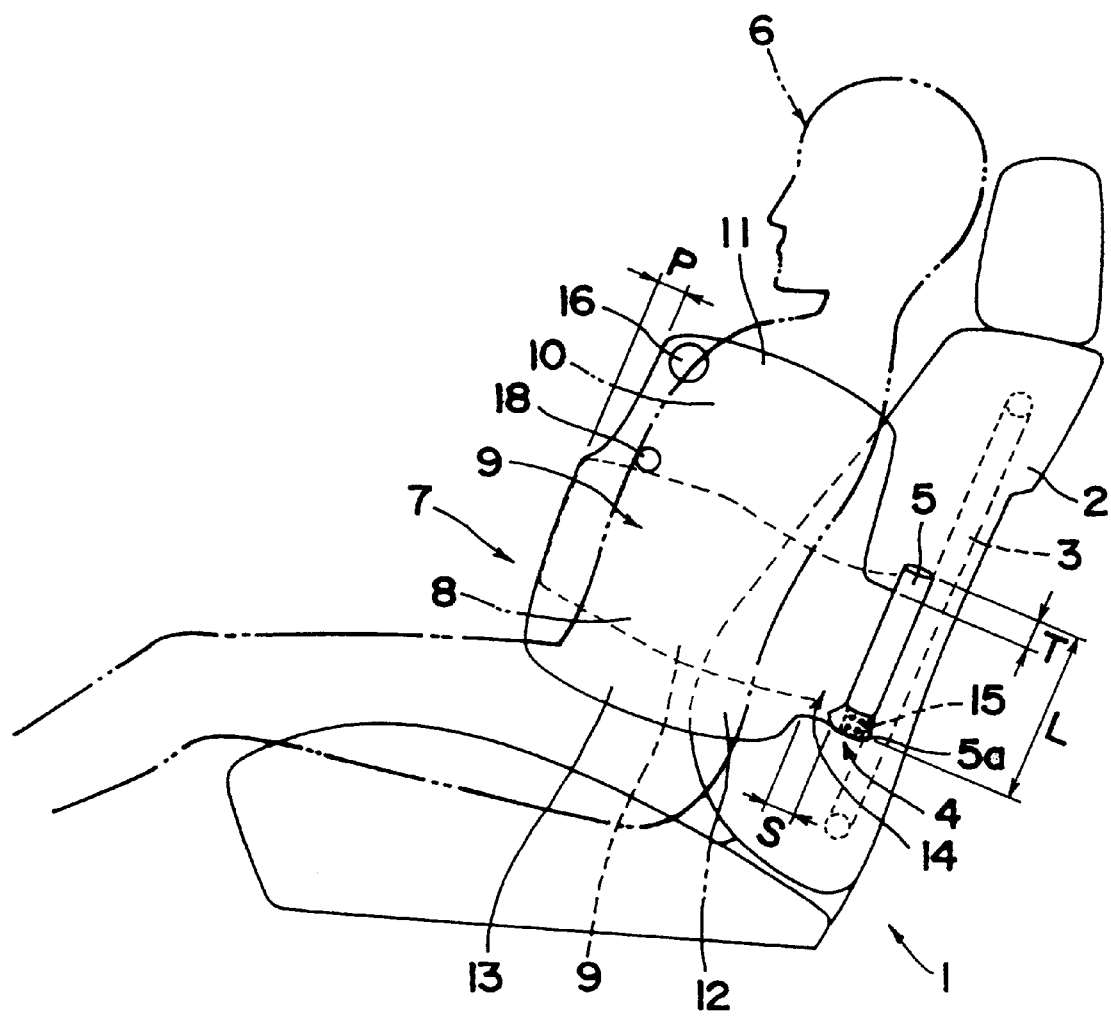
FIG. 1 is a side view showing a side impact air bag system according to an embodiment of the present invention.
Figure 2:
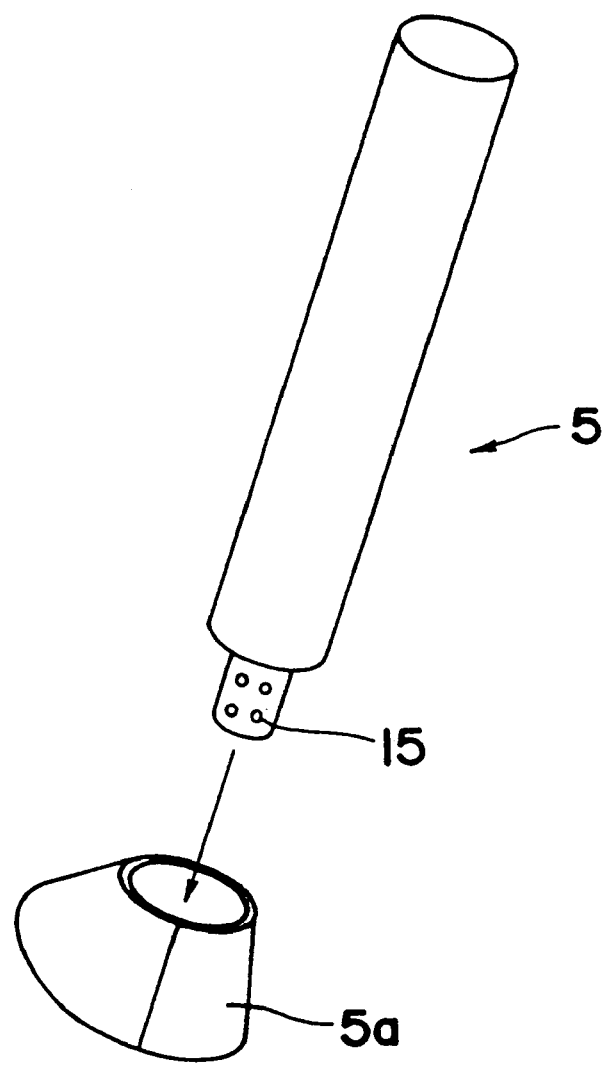
FIG. 2 a an exploded perspective view of an inflator.
Figure 3:
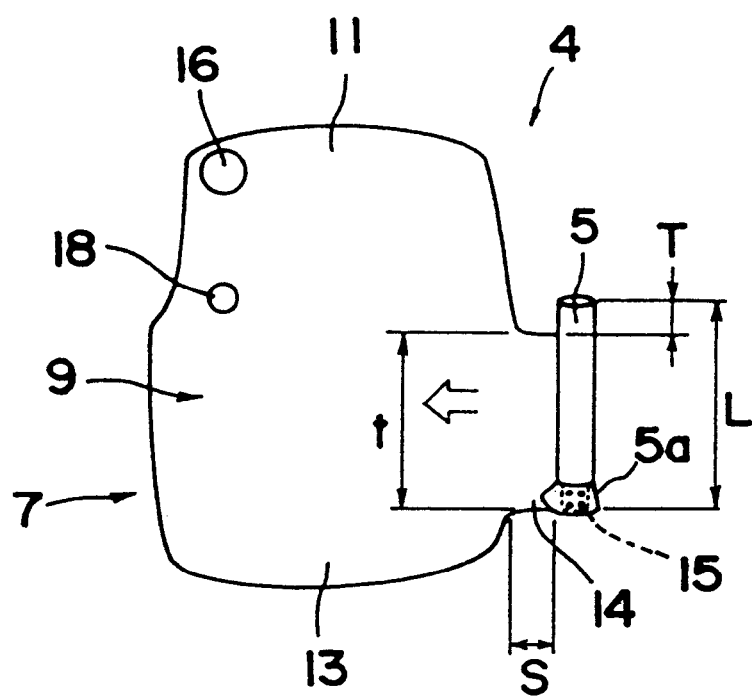
FIG. 3 is a side view of the bag.
Figure 4:
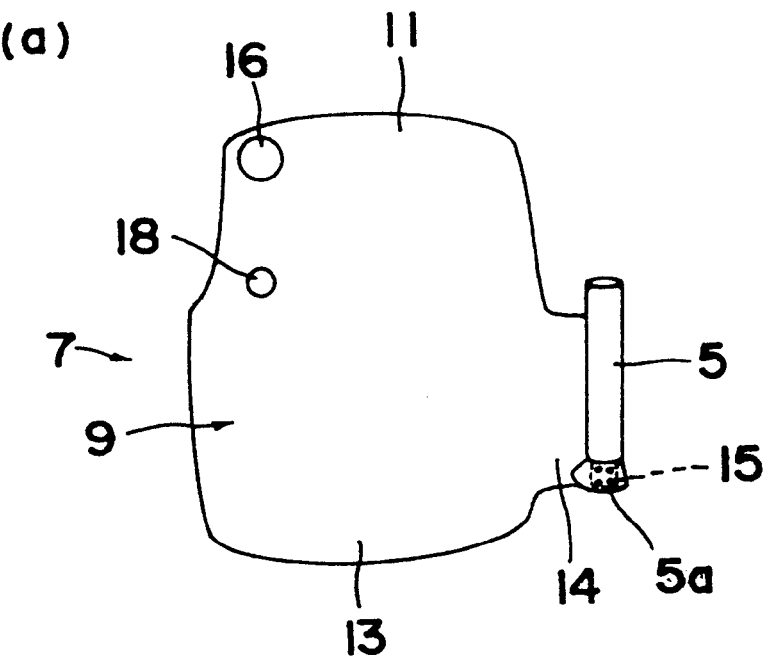
FIGS. 4(a), (b) and (c) are explanatory views of a folded bag.
Figure 4:
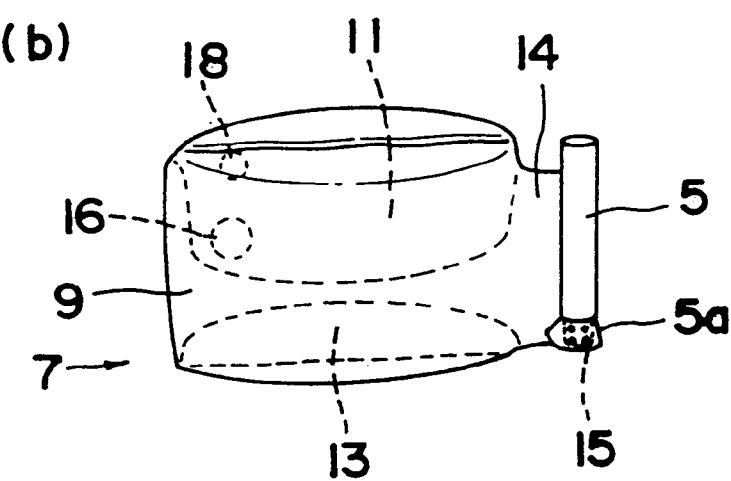
Figure 4:
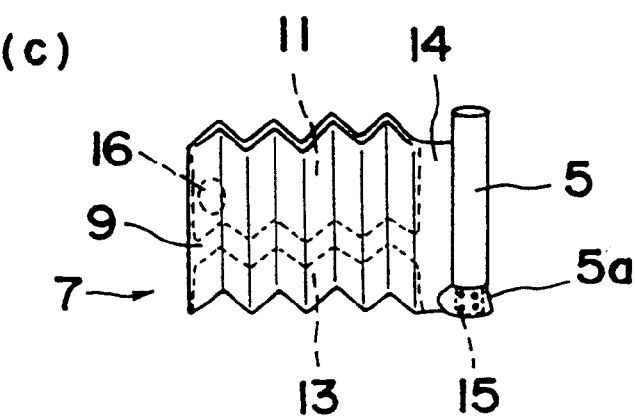
Figure 5:
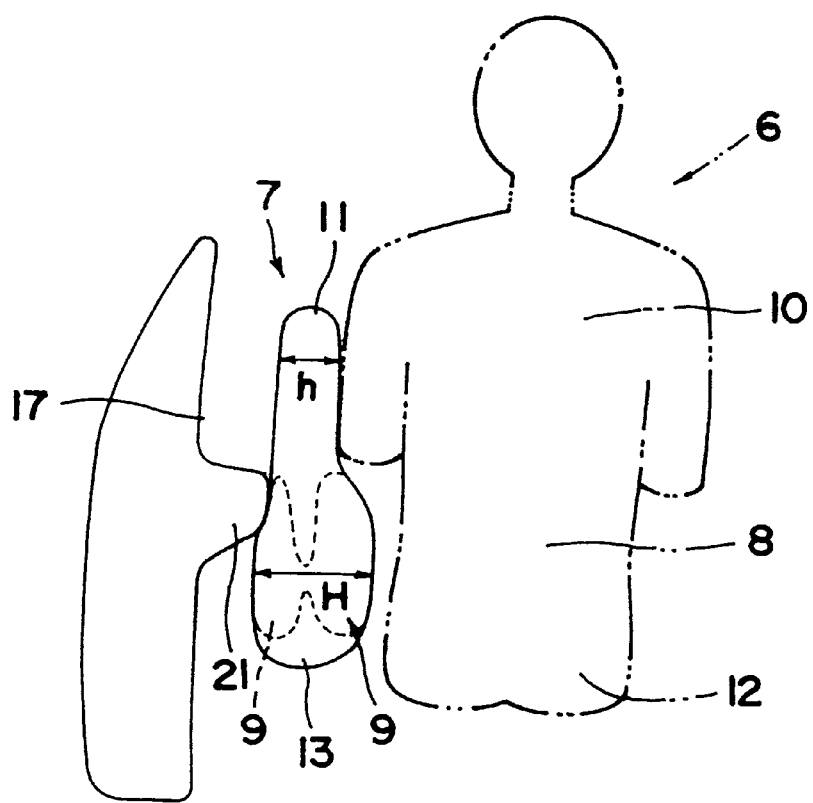
FIG. 5 is a rear view showing the relationship between the side of the vehicle and the passenger when the bag is inflated.
Figure 6:
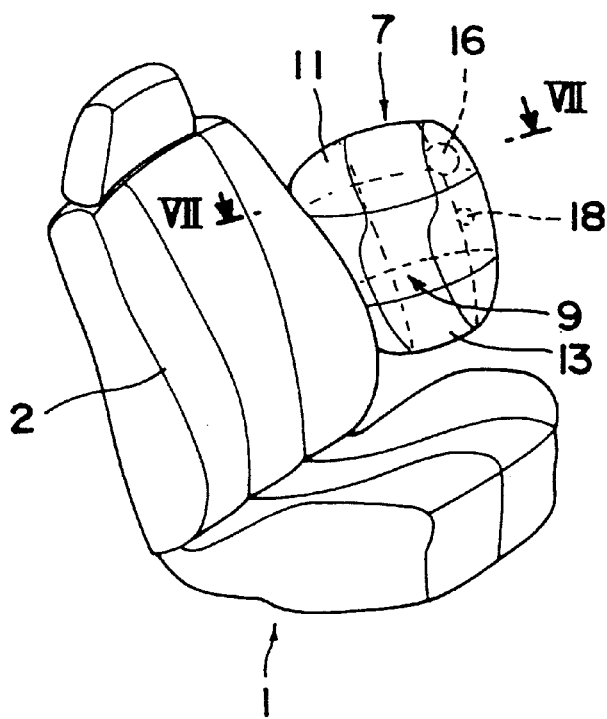
FIG. 6 is a perspective view when the bag is inflated.
Figure 7:
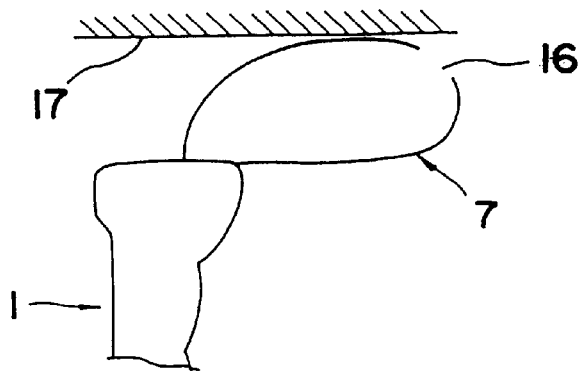
FIG. 7 is a cross sectional view taken along the line VII—VII in FIG. 6.

In the following, embodiments of a structure of a side impact air bag system of the present invention will be described by referring to the accompanying drawings. FIG. 1 shows a side view of a side impact air bag system according to an embodiment of the present invention; FIG. 2 shows an exploded perspective view of an inflator; FIG. 3 shows a side view of the bag; FIG. 4 shows a view of a folded bag; FIG. 5 shows a rear view of the relationship between the side of the vehicle and the passenger when the bag is inflated; FIG. 6 shows a perspective view when the bag is inflated; and FIG. 7 shows a cross sectional view taken along the line VII—VII in FIG. 6.

As shown in FIG. 1, a frame 3 of a seat back 2 of a vehicle seat 1 is provided with a side impact air bag system 4. The side impact air bag system 4 has a bag 7 which is inflated between the side of the vehicle and a passenger 6 by gas blown out from an inflator 5 serving as a gas generating device. The bag 7 comprises: a main body 9 for covering a side of an abdomen portion 8 of the passenger 6 when the bag is inflated; an upper inflation unit 11 as an inflation unit which, when the bag is inflated, is deployed in an upward direction above the main body 9 in order to cover a side of a chest portion 10 (the rib portion) of the passenger; and a lower inflation unit 13 which is deployed in a downward direction below the main body 9 in order to cover the lower part of the abdomen portion 8 and a part of a waist portion 12 of the passenger 6. The bag 7 is connected to the inflator 5 by means of a gas intake portion 14 for suppressing diffusion of the gas blown out from the inflator 5.

As shown in FIGS. 1 and 2, the inflator 5 is cylindrically formed and filled with a compressed gas, and blowing ports 15 for blowing the gas are provided at the lower portion of the inflator 5. The blowing ports 15 are disposed at a height substantially equal to the abdomen portion 8 of the passenger 6, and an umbrella-shaped guide member 5a is mounted on the lower portion of the inflator 5 for covering the blowing ports 15 and guiding the blown out gas in the downward direction, that is, to the lower inflation unit 13. With the guide member 5a mounted thereon, the gas blown out from the blowing ports 15 is positively guided to the lower inflation unit 13 (lower portion), so that the gas is positively guided to the portion of the bag 7 opposing the abdomen portion 8 of the passenger 6.

Here, the guide member 5a is mounted on the lower portion of the inflator 5 to guide the gas blown out from the blowing ports 15 to the lower inflation unit 13 and to the portion of the bag 7 opposing the abdomen portion 8 of the passenger 6. Alternatively, the guide member 5a can be omitted depending on the position of the blowing ports 15. Still further, the lower inflation unit 13 of the bag 7 can be formed to cover the entire waist portion 12 of the passenger 6.

The upper inflation unit 11 of the bag 7 is provided with a first vent hole 16 serving as internal pressure adjusting means, by which the gas is appropriately discharged from the first vent hole 16 to obtain an appropriate pressure inside the bag 7 for absorbing the shock when the bag 7 is inflated. As shown in FIGS. 6 and 7, the first vent hole 16 is formed at a portion away from the inflator 5 when the bag 7 is inflated and on the upper portion (upper inflation unit 11) on the side surface opposite to the passenger 6. Further, the first vent hole 16 is formed at a portion where the inflated bag 7 is not in contact with a door trim 17 as one of structural members of vehicle compartment, that it, at the tip where the inflated bag 7 is made R-shaped.

In addition, a second vent hole 18 having a smaller diameter than the first vent hole 16 is formed in the upper inflation unit 11 in the vicinity of the boundary of the main body 9 of the bag 7 and the upper inflation unit 11. The second vent hole 18 is also formed at a portion where the inflated bag 7 is not in contact with the door trim 17 as one of structural members of vehicle compartment, that is, at the tip where the inflated bag 7 is made R-shaped.

In the above described embodiment, the first vent hole 16 is described as an example of pressure adjusting means. However, the pressure adjusting means is not limited to such first vent hole 16, as it is also possible to employ any system which can maintain the pressure of the portion (upper inflated portion 11) of the bag 7 opposing the chest portion 10 of the passenger 6 at a smaller value when the bag 7 is being appropriately inflated, that is, at a reduce the pressure.

Next, the gas intake portion 14 will be described. As shown in FIG. 3, the gas intake portion 14 is formed at a position lower by a width T from the top end of the inflator 5 and has a width t from the bottom end of the inflator 5. Further, the gas intake portion 14 extends toward the main body 9 by a predetermined distance S and continues to the bag 7. Namely, the gas intake portion 14 of the bag 7 has a connecting portion connecting the bag 7 to the inflator 5, shorter than the length of the inflator 5. With the gas intake portion 14, the gas from the inflator 5 is blown forward to the portion of the main body 9 without diffusion.

Figure 8:
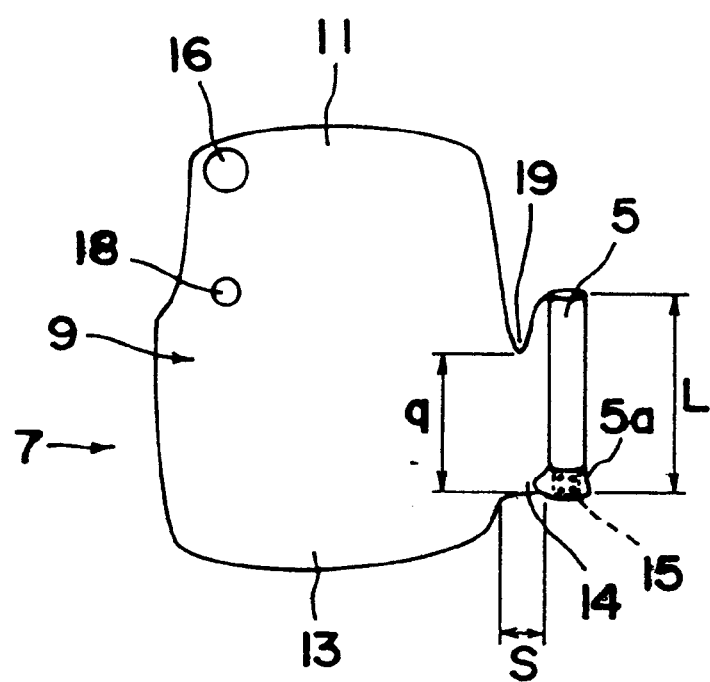
FIG. 8 is a side view showing another embodiment of a gas intake portion.

Here, the gas intake portion 14 may be formed such that the width t is extended to a length L in the vertical direction of the inflator 5. Also, in this case, the gas intake portion 14 extends toward the main body 9 by a predetermined distance s and continues to bag 7. In addition, as shown in FIG. 8 which shows the side view of the bag 7, a narrowed portion 19 having a width q shorter than the vertical length L of the inflator 5 may be provided so that the gas intake portion 14 is connected to the top and bottom ends of the inflator 5 and extended by the predetermined distance S in a horizontal direction. The position of the narrowed portion 19 can be appropriately set to suppress diffusion of the gas blown out from the inflator 5 and regulate the blowing of the gas to a selected direction.

On the other hand, as shown in FIG. 1, the tip in the longitudinal direction (direction away from the inflator 5) of the upper inflation unit 11 of the bag 7 is made shorter by a length P than the main body 9. The length of the upper inflation unit 11 is shortened as compared with the length of the main body 9 in the direction away from the inflator 5 by shortening the connection of the gas intake portion 11 to the inflator 5 and by cutting the tip of the upper inflation unit 11. As shown in FIG. 5, by shortening the length of the upper inflation unit 11 as compared with the main body 9, a width h of the upper inflation 11 is made narrower than a width H of the main body 9 when the bag 7 is developed.

As a component for narrowing the width of the upper inflation unit 11, as shown in FIG. 9(a) showing a side view of the bag 7 and in FIG. 9(b) showing a cross sectional view in FIG. 9(a), it is possible to attach both ends of a strap 20 to the inner surface of the upper inflation unit 11. In this case, a length M of the strap 20 is shorter than the width H when the main body 9 is inflated (see FIG. 9(b)). Thus, in the upper inflation unit 11, inflation in the width direction is suppressed by the strap 20, and the width h, when the upper inflation unit 1 is inflated, is narrower than the width H of the main body 9.

In the above-described embodiment, the width of the upper inflation unit 11 when inflated is narrower than the width of the main body, however, at least the width of the boundary of the upper inflation unit 11 and the main body 9 may be narrower than the main body.

Description will now proceed to the folding condition of the bag 7 by referring to FIG. 4. As shown in FIGS. 4(a) and (b), the upper inflation unit 11 and the lower inflation unit 13 are folded and vertically contained respectively within the main body 9, so that the folded cross section is substantially made U-shaped. In this case, the first vent hole 16 is contained inside the main body 9. As shown in FIG. 4(c), after the upper inflation unit 11 and the lower inflation unit 13 are folded inside of the main body 9, the bag 7 is sequentially folded in the shape of a bellows towards the inflator 5.

Figure 10:
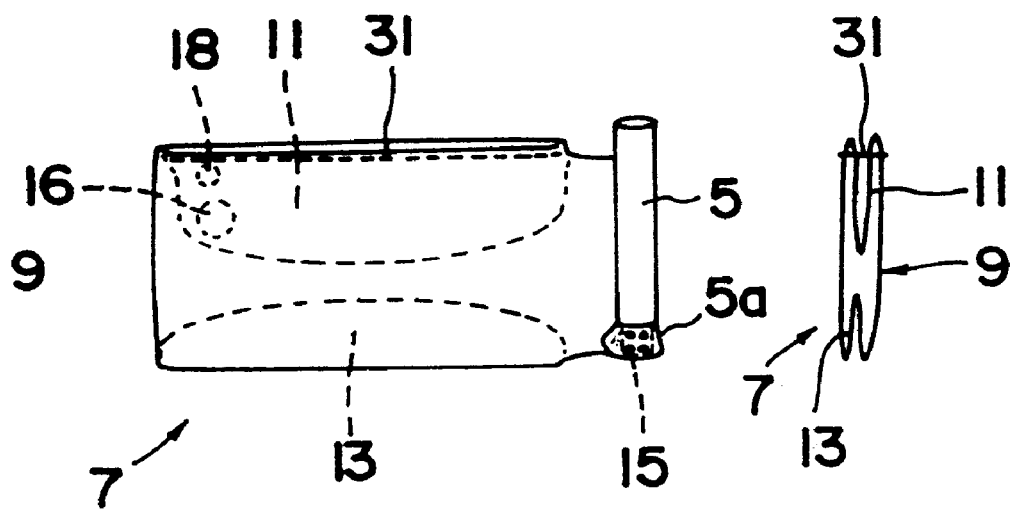
FIGS. 10(a) and (b) are explanatory views showing an embodiment of a bag temporarily sewn at the upper edge of the bag main body.
Figure 11:
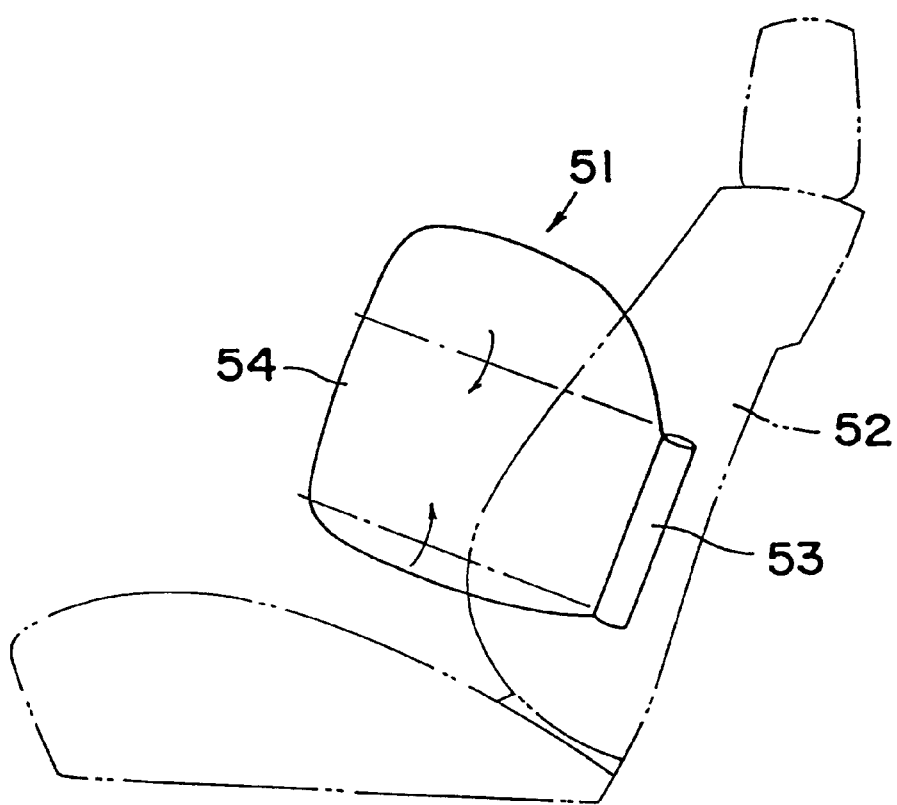
FIG. 11 is a side view showing a conventional side impact air bag system.
Figure 12:
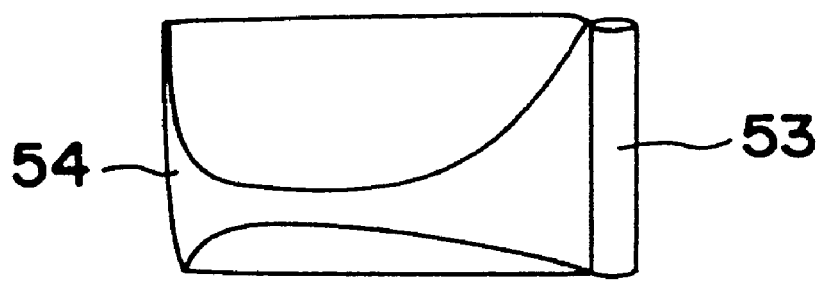
FIGS. 12(a) and (b) are explanatory views of a folded bag.
Figure 12:
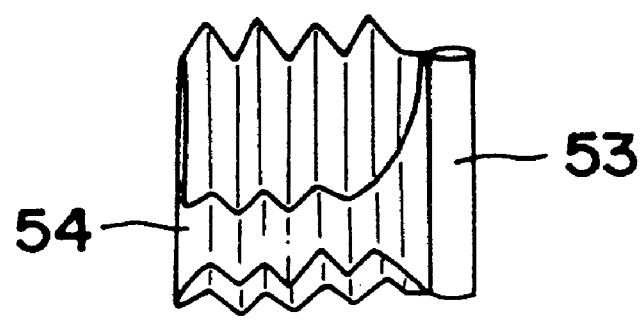
Figure 13:
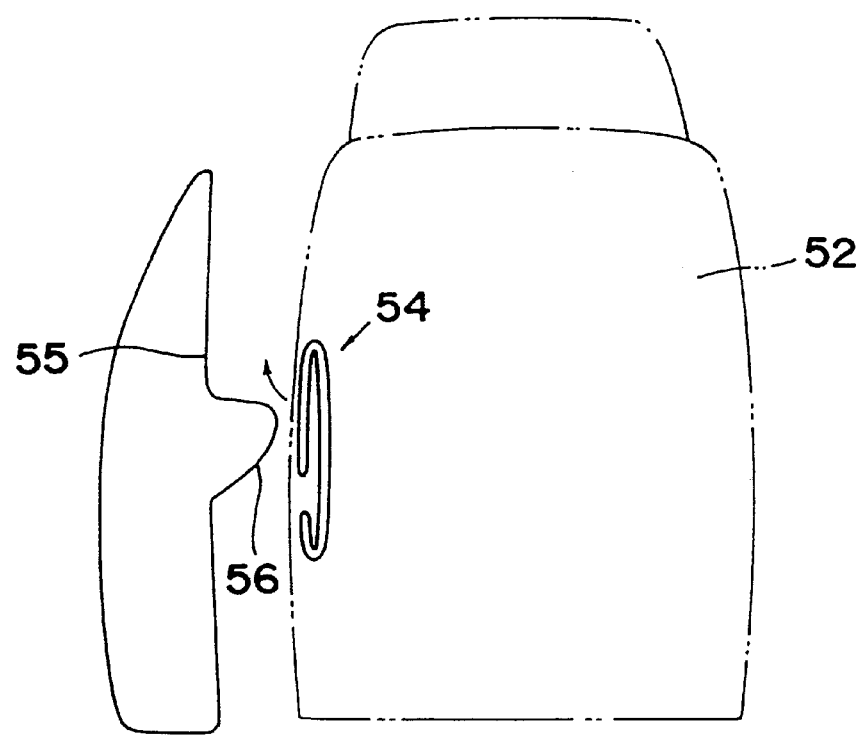
FIG. 13 is a rear view of showing a relationship portion between the side of the vehicle and the passenger while the bag is inflated.

Here, as shown in FIGS. 10(a) and (b), it is possible to temporarily sew the upper edge of the main body 9 of the portion where the upper inflation unit 11 is folded inside the main body 9 to connect as a sewn portion 31 (separated at a pressure above a predetermined pressure). By connecting the upper edge of the main body 9 as the sewn portion 31, upward diffusion of the gas from the inflator 5 is suppressed when the bag 7 is inflated, and the gas blown out from the inflator 5 is blown out towards substantially forward side of the main body. Further, it is possible to directly join the upper edge of the main body 9 with an adhesive or the like instead of sewing.

The bag 7 contained by the above-described manner is inflated by the gas blown out from the inflator 5 when the side impact is detected by the detecting means (not shown).

The description will proceed to an operation of the side impact air bag system 4 having the above described structure.

When a side impact of the vehicle is detected by detection means (not shown), the gas in the inflator 5 is blown out from the blowing ports 15 to start inflating the bag 7. The gas blown out from the blowing ports 15 is guided by the guide member 5a to the lower portion of the bag 7, and diffusion is suppressed by the gas intake portion 14 to be blown in the forward direction. As a result, the portion of the main body 9 of the bag 7 (portion opposing the abdomen portion 8 of the passenger 6) is momentarily inflated by a high pressure (conditions from FIGS. 4(c) to (b) and see the dotted line portions in FIGS. 1 and 5), and the main body 9 enters between the passenger 6 and the door trim 17 or the armrest 21.

When the main body 9 intervenes between the passenger 6 and the door trim 17 or the armrest 21, the abdomen portion 8 having a higher shock load resistance than the chest portion 10 is pressed to move the passenger 6 away from the door trim 17 or the armrest 21. This presses the passenger 6 in the same direction of the movement of the door trim 17 (armrest 21) into the vehicle compartment at side impact, whereby relaxing the relative velocity to the deformation.

Here, as shown in FIG. 10(a) and (b), with the upper edge of the main body 9 temporarily joined by the sewn portion 31, diffusion of the blown out gas is suppressed still further, which allows to positively blow the gas to the forward side, combining with the suppressing action by the gas intake portion 14, thereby facilitating the inflation of the portion of the bag 7 at the desired position, that is , the portion opposing the abdomen portion 8.

By guiding the gas blown from the blowing ports 15 of the inflator 5 in the downward direction by the guide member 5a and by suppressing diffusion of the gas by the gas intake portion 14, the main body 9 opposing the abdomen portion 8 which has a higher shock load resistance than the chest portion 10, in other word, the desired portion of the bag can be positively inflated between the passenger 6 and the door trim 17 (armrest 21). Thus the bag 7 is inflated in the narrow space momentarily by a high pressure, whereby relaxing the relative velocity with respect to the movement of the vehicle components in the passenger compartment.

When the gas is continuously blown out from the blowing ports 15 of the inflator 5 into the bag 7, the upper inflation unit 11 and the lower inflation unit 13 are inflated in upward and downward directions, respectively, from the inside of the main body 9 (see the condition from FIG. 4(b) to (a) and the dotted line portion of FIGS. 1 and 5), and the upper inflation unit 11 is developed between the door trim 17 and the chest portion 10 of the passenger 6. In addition, the lower inflation unit 16 is inflated between the door trim 17 and a part of the waist portion 12 of the passenger 6.

At this moment, the upper inflation unit 11 and the lower inflation unit 13 are vertically inflated respectively, which allows the bag 7 to inflate without being interfered by the door trim 17 or the armrest 21. Further, as shown in FIGS. 6 and 7, the unit 11 having the first vent hole 16 and the second vent hole 18 formed at the tip thereof becomes R-shape when the bag 7 is inflated. Therefore, the upper inflation unit 11 can be inflated without having the first vent hole 16 and the second vent hole 18 being closed by the door trim 17 or the armrest 21. Consequently, the gas discharged condition can be maintained appropriately to obtain an appropriate pressure inside the bag 7.

In the process of deploying the upper inflation unit 11, the internal volume of the bag 7 is increased in accordance with the inflation of the upper inflation unit 11 from the main body 9, and the gas is discharged from the first vent hole 16 in the predetermined condition, thereby the appropriate pressure to absorb the shock is obtained. Also, in the process of deploying the upper inflation unit 11, gas is discharged from the second vent hole 18 in the vicinity of the boundary of the main body 9 and the upper inflation unit 11, that is, in the vicinity of the portion opposing the lower portion of the chest portion 10 (the lowest rib). Further, when the bag 7 is fully inflated, since the connection of the gas intake portion 14 to the inflator 5 is shortened and the length of the upper inflation unit 11 is shortened as compared with the main body 9, as shown in FIG. 5, the width h of the upper inflation unit 11 is made narrower than the width H of the main body 9.

Accordingly, since an appropriate pressure for absorbing the shock is produced between the door trim 17 and the chest portion 10 which has a lower shock load resistance than the abdomen portion 8, and the upper inflation unit 11 having the reduced width inflates, the bag 7 can be inflated without applying a shock to the chest portion so as to absorb the shock force against the movement of the door trim 17 (armrest 21) in the direction of the vehicle compartment. Further, the gas is discharged from the vicinity of the boundary of the main body 9 and the upper inflation unit 11, thereby relaxing the shock when the bag starts contacting with the lower portion of the chest portion 10 (the lowermost rib).

Figure 9:
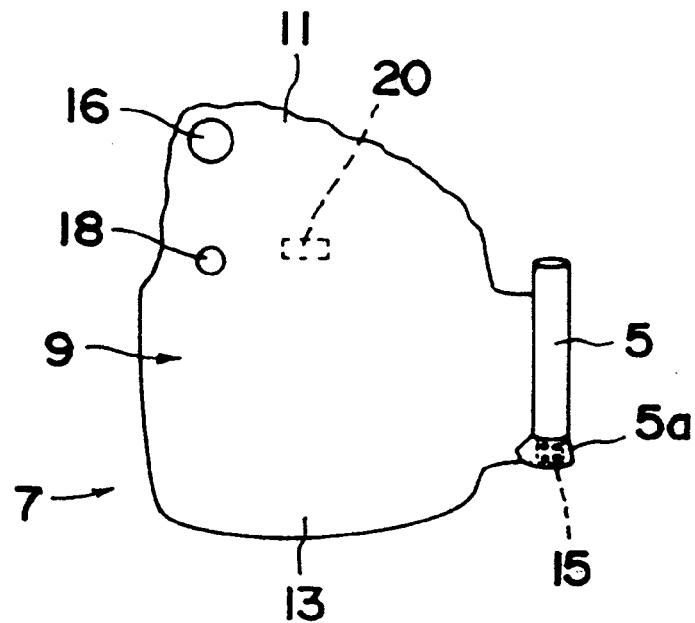
FIGS. 9(a) and (b) are explanatory views showing an embodiment of a bag having a reduced width of the upper inflation unit by a strap.
Figure 9:
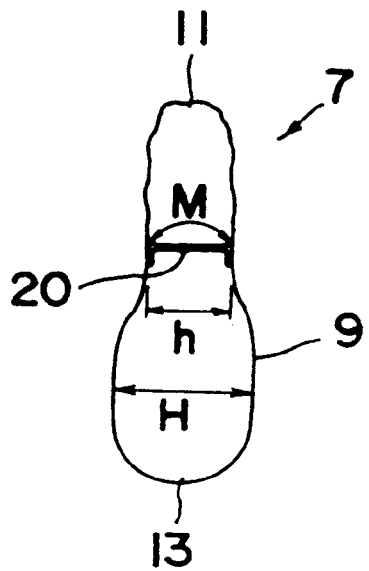

As shown in FIG. 9, even when the width h of the upper inflation unit 11 is made smaller than the width H of the main body 9 by using the strap 20, the bag 7 can be similarly inflated without applying a high shock to the chest portion 10, thereby absorbing the shock force against the deformation of vehicle structural members.

With the above-described side impact air bag system 4, the gas from the inflator is blown towards the lower portion of the bag 7 and diffusion of the gas is suppressed by the gas intake portion 14, when a side impact occurs, the inflation of the bag 7 is started by a high pressure from the part of the main body 9 opposing the abdomen portion 8 which has a higher shock load resistance than the chest portion 10. In other word, inflation of the bag 7 inflates from a portion other than the portion opposing the chest portion 10 having the lower shock load resistance, thus the bag 7 is brought in contact with the abdomen portion 8 and not in contact with the chest portion 10 during inflation under high pressure. Consequently, the bag 7 is momentarily and positively inflated in the narrow space between the passenger 6 and the door trim 17 (armrest 22) to press the passenger 6 toward the inside of the compartment, the relative velocity with respect to the movement of the door trim 17 (armrest 22) towards the vehicle compartment can be relaxed.

After the main body 9 opposing the abdomen portion 8 is inflated, and when inflation of the upper inflation unit 11 from the main body 9 is started, while the gas is discharged from the vicinity of the boundary of the main body 9 and the upper inflation unit 11 by the second vent hole 18 associated with inflation of the upper inflation unit 11, and the gas is discharged from the first vent hole 16 in the constant condition. Thus, when the upper inflation unit 11 is inflated from the inside of the main body 9, the upper inflation unit 11 having a smaller width than that of the main body 9 is inserted between the door trim 17 and the chest portion 10 with a slightly reduced internal pressure of the upper inflation unit 11. Accordingly, the internal pressure of the upper inflation unit 11 is appropriately adjusted, so that the bag 7 can be inflated without applying a high shock to the chest portion 10 and the shock force to the movement of the door trim 17 into the vehicle compartment can be absorbed.

Since the upper inflation unit 11 and the lower inflation unit 13 are inflated in the vertical direction from the condition folded within the main body 9, there is no possibility of the upper inflation unit 11 and the lower inflation unit 13 interfering with the door trim 17 or the arm rest 21, and inflation of the bag 7 is not obstructed. Further, since the first vent hole 16 and the second vent hole 18 are provided at the portion where they are not affected by the deformation of the door trim 17, the first vent hole 16 and the second vent hole 18 will not be closed even in a case where the door trim 17 is deformed towards the inside of the vehicle compartment. Consequently, gas discharged while the bag 7 is inflated is not obstructed, thereby always obtaining the desired internal pressure.

As described in the foregoing, the inflation of the main body 9 is regulatable towards the abdomen portion 8 into the desired condition, and the restraining condition of the passenger 6 can be increased. In addition, gas blowing direction from the inflator 5 is regulatable by the gas intake portion 14, so that high pressure gas to the upper inflation unit 11 opposing the chest portion 10 is prevented from blowing, thereby improving the restraining condition of the passenger 6.

Further, the internal pressure inside the bag 7 is appropriately adjusted by the first vent hole 16 and the second vent hole 18, and the width of the upper inflation unit 11 is narrowed as compared with the main body 9, thereby the bag 7 can be inflated without applying a high shock to the chest portion 10. The first vent hole 16 and the second vent hole 18 are placed at positions which will not be closed by vehicle structure members, thus the desired internal pressure can be always obtained and the restraining condition of the passenger is not decreased. Furthermore, by inflating the upper inflation unit 11 and the lower inflation unit 13 in the vertical direction, the possibility of the bag being interfered with the door trim 17 or the armrest 21 during inflation is eliminated.

According to the side impact air bag system of the present invention, the bag is formed of the main body and the inflation units inflated by the gas blowing out from the gas generating device, wherein the inflation units are folded and contained within the main body so that the inflation units can be inflated from inside. Consequently, there is no possibility for development of the bag to be obstructed by interfering of the vehicle structure members in the process of inflating the bag, thereby the bag can be positively inflated.

Further, according to the side impact air bag system of the present invention, since the bag is connected to the gas generating device through the gas intake portion for regulating diffusion of the gas blown out from the gas generating device in order to regulate the direction of the gas, and the bag is formed by the main body and the inflation units having the vent holes so that the bag is folded and contained in the main body, it is possible to regulate the inflation of the bag so that the chest portion of the passenger makes contact with the bag after a portion of the bag opposing the abdomen portion having a higher load resistance than that of the chest portion inflates and absorbs shock to the abdomen portion. Further, the inflating units can be inflated from side when the bag is inflated. Consequently, the inflation of the bag can be regulated at a desired condition to improve the restraining condition of the passenger, and the possibility that the bag being obstructed from inflating due to the interference by the vehicle components in the process of inflating the bag is eliminated, thereby the bag can be positively inflated.

What is claimed is:

1. A side impact air bag system having a bag inflated between a side of a vehicle and a passenger by a gas blown out from a gas generating device, said bag comprising:

a first portion facing an abdomen portion of said passenger when inflated;

a second portion facing a chest portion of said passenger when inflated; and an inflation portion folded within said first portion prior to the inflation of the bag, and deployed in a downward direction when said bag is inflated, wherein said second portion is folded within said first portion prior to the inflation of the bag, and deployed from said first portion when said bag is inflated.

2. A side impact air bag system of claim 1, wherein said first portion is sequentially folded toward said gas generating device while containing therein said second portion prior to the inflation of the bag.

3. A side impact air bag system of claim 1, wherein said second portion is deployed prior to said second portion.

4. A side impact air bag system of claim 1, wherein said first portion is sequentially folded toward said gas generating device while containing said inflating portion prior to the inflation of the bag.

5. A side impact air bag system of claim 1, wherein said first portion is sequentially folded toward said gas generating device while containing said second portion and said inflating portion prior to the inflation of the bag.

6. A side impact air bag system of claim 5, wherein said second portion is formed above said first portion and said inflation portion is formed below said first portion to protect a waist portion of the passenger.

7. A side impact air bag system of claim 1, wherein an edge of said first portion, when said second portion and said inflating portion are being contained therein, is releasably joined to be separated at a pressure above a predetermined pressure to allow inflation of said second portion and said inflation portion.

8. A side impact air bag system of claim 1, wherein said second portion has at least one vent hole for discharging gas in said second portion.

9. A side impact air bag system of claim 1, wherein said at least one vent hole is inside said first portion when said second portion is folded inside said first portion.

10. A side impact air bag system having a bag inflated between a side of a vehicle and a passenger by a gas blown out from a gas generating device, said bag comprising:

a first portion facing an abdomen portion of said passenger when inflated; and a second portion facing a chest portion of said passenger when inflated, wherein said second portion is folded within said first portion prior to the inflation of the bag, and deployed from said first portion when said bag is inflated;

wherein an edge of said first portion, when said second portion is being contained therein, is releasably joined to be separated at a pressure above a predetermined pressure to allow deployment of said second portion.

11. A side impact air bag system of claim 10, wherein said edge of first portion is sewn.

12. A side impact air bag system, comprising:

an inflator attached to a structure of a vehicle adjacent to a passenger, said inflator generating gas when a shock is applied to the vehicle; and a bag including:

a first portion for protecting an abdomen portion of a passenger, said first portion being connected to said inflator; and a second portion for protecting a chest portion of the passenger, said second portion being connected to said first portion and folded inside said first portion prior to deployment of the bag, wherein a joint portion connecting said first portion and said second portion is releasably closed after said second portion is folded inside said first portion.

13. A side impact air bag system of claim 12, wherein said joint portion is released when a pressure inside said first portion exceeds a predetermined value.

14. A side impact air bag system of claim 12, wherein said inflator is attached to a frame of a vehicle seat.

15. A side impact air bag system having a bag inflated between a side of a vehicle and a passenger by a gas blown out from a gas generating device, said bag comprising:

a first portion facing an abdomen portion of said passenger when inflated; and a second portion facing a waist portion of said passenger when inflated, wherein said second portion is folded within said first portion prior to the inflation of the bag, and deployed in a downward direction from said first portion when said bag is inflated.

16. A side impact air bag system of claim 15, wherein said second portion has at least one vent hole for discharging gas in said second portion.

17. A side impact air bag system of claim 15, wherein said first portion is deployed prior to said second portion.

18. A side impact air bag system of claim 15, wherein said first portion is sequentially folded toward said gas generating device while containing therein said second portion prior to the inflation of the air bag.

19. A side impact air bag system of claim 15, wherein an edge of said first portion, when said second portion is being contained therein, is releasably joined to be separated at a pressure above a predetermined pressure to allow the deployment of said second portion.

* * * * *